United States Patent
Joesting

[15] 3,648,716
[45] Mar. 14, 1972

[54] PRESSURE INVERTER

[72] Inventor: Frederick D. Joesting, Park Ridge, Ill.
[73] Assignee: Honeywell Inc., Minneapolis, Minn.
[22] Filed: Aug. 25, 1970
[21] Appl. No.: 66,714

[52] U.S. Cl. ............................................. 137/85, 137/84
[51] Int. Cl. ............................................. G05d 23/00
[58] Field of Search ....................... 137/82, 85; 235/201 ME

[56] References Cited
OTHER PUBLICATIONS

I.B.M. Technical Disclosure Bulletin; Vol. 8, No. 8; "Pneumatic Latch Circuit"; Norwood; 1/1966

*Primary Examiner*—Alan Cohan
*Attorney*—Lamont B. Koontz

[57] ABSTRACT

A pneumatic pressure inverter with pilot bleed utilizing diaphragm logic to augment the supply and exhaust functions whereby a fast response and a linear output is achieved. The sum of the branch pressure input and the output pressure is continuously held equal to the main pressure input.

8 Claims, 3 Drawing Figures

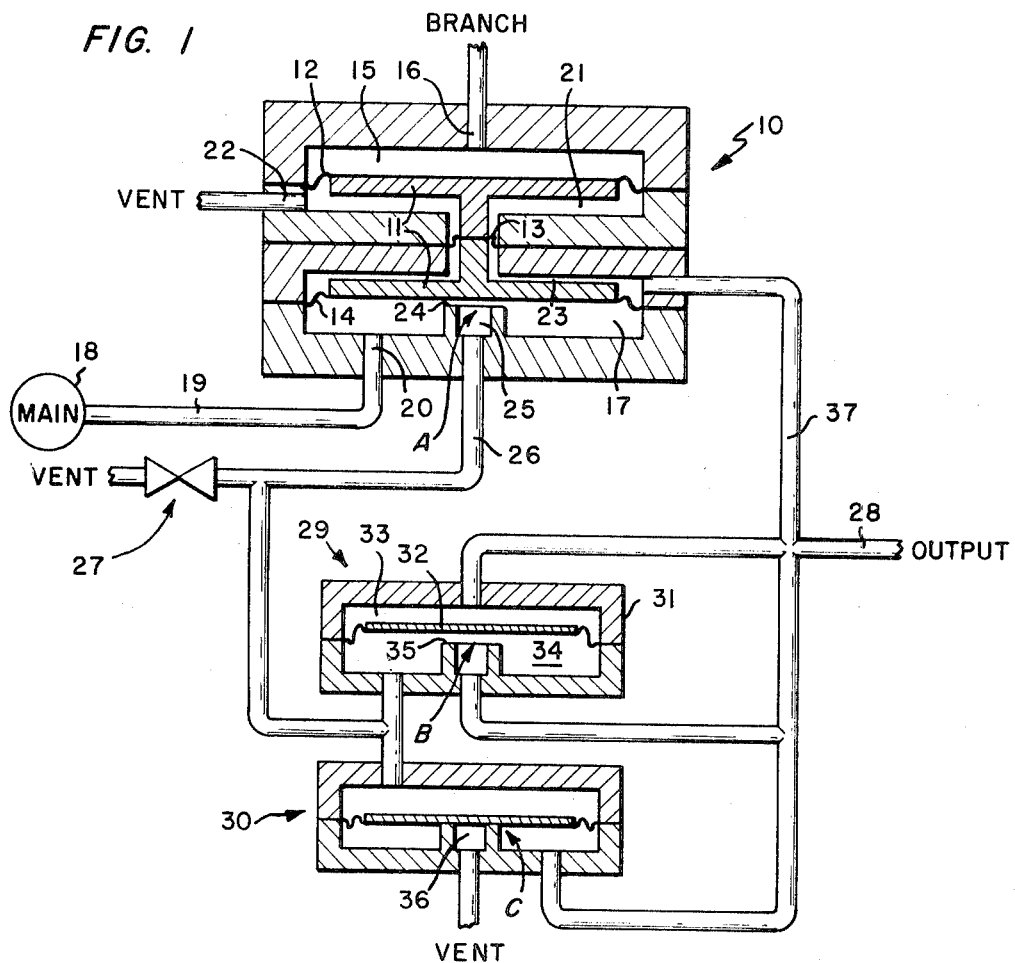
FIG. 1
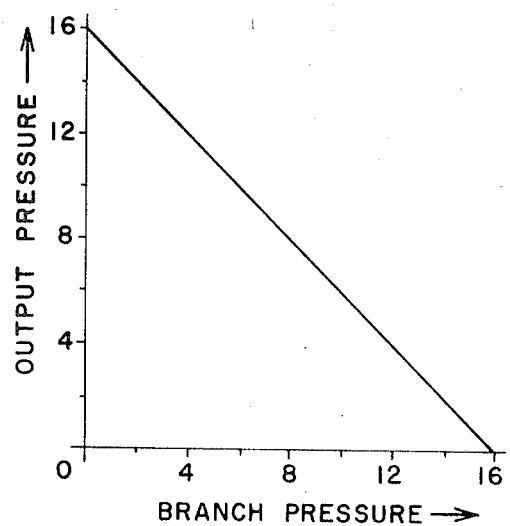
FIG. 2
FIG. 3
| BRANCH | A | B | C | OUTPUT |
|---|---|---|---|---|
| ↑ | C | C | O | ↓ |
| ↓ | O | O | C | ↑ |
INVENTOR.
FREDERICK D. JOESTING
BY
ATTORNEY.

PRESSURE INVERTER

BACKGROUND AND SUMMARY OF THE INVENTION

This invention relates to pressure responsive apparatus used in pneumatic control systems and more particularly to a pneumatic pressure inverter.

Ordinarily in a pneumatic control system having direct acting thermostats, a low thermostatic output pressure exists when the space temperature is cool and a higher thermostatic output pressure exists when space temperature is warmer. In winter the valve must be opened when the space temperature is cool in order to achieve heating. On the other hand in summer the same valve should be opened when the space temperature is warm since cooling is required. Consequently in summer the thermostatic output pressure must be inverted. The response of such a pneumatic pressure inverter must be rapid and its output should be linear. Additionally it is desirable to use a restricted bleed in order to minimize air consumption.

It is accordingly an object of the subject invention to provide a limited or pilot bleed pneumatic pressure inverter having a linear output. A two-layered diaphragm module is used to equate the main pressure signal with the sum of the branch and output pressures. Two additional diaphragm modules augment the supply and exhaust functions to obtain a fast, and a linear response.

DESCRIPTION OF THE DRAWING

FIG. 1 is a sectional view of the preferred embodiment of the pressure inverter.

FIG. 2 is a graph showing the relation between the branch and the output pressures.

FIG. 3 is a table showing the various valve positions (open or closed) depending on whether the branch pressure is increasing or decreasing.

DETAILED DESCRIPTION OF THE INVENTION

In FIG. 1 a two-layered diaphragm module 10 has movably disposed therein two pressure plates 11 separated by a seal diaphragm 13. The seal diaphragm 13 isolates chambers 21 and 23 but permits the pressure plates 11 to transmit both force and motion one to the other. The pressure plates so coacting form a spool-shaped member and will be so referred to hereinafter although it should be understood that the spool member may be two separate pieces as above described. The spool member or pressure plates 11 is carried by two diaphragms 12 and 14 which separate chambers 21 and 23 from chambers 15 and 17 respectively. Opening into branch pressure chamber 15 is branch port 16 while communicating with main pressure chamber 17 is main pressure source 18 through conduit 19 and port 20. Chamber 21 is vented to ambient through port 22 while output pressure chamber 23 is arranged to receive the output pressure from outlet 28 through conduit 37. It is thus appreciated that the output and branch pressures act downwardly or in a first direction on the spool member while the main pressure acts upwardly or in a second direction on the spool member. The sum of the output and branch pressures is thereby equated with the main pressure whereby the inversion of the branch pressure is achieved.

Disposed with the main pressure chamber 17 is an annular partition 24 forming a valving chamber 25 which may be closed off by the spool member 11 acting on the diaphragm 14. In communication with the valving chamber 25 is conduit 26 connected to a restricted vent or venting means 27. Outlet 28 is connected to the output pressure chamber 23 via conduit 37. It will be appreciated that were conduit 26 directly connected to outlet 28, with the remaining diaphragm modules and concomitant circuitry omitted, there would be an inverted pressure output at outlet 28. With this arrangement, if the branch pressure were reduced, the output pressure would rapidly increase to the proper value. However, if the branch pressure were increased, the outlet pressure would decrease very slowly as the air would have to exhaust through the restriction or venting means 27. If venting means 27 were made to be larger, the response time would be faster but the air consumption would increase significantly. The inclusion of supply and exhaust means or valve means 29 and 30 allows the use of restriction 27 and thereby the limitation of air consumption while at the same time provides a fast response as will be described below.

Each of the valve means 29 and 30 comprises a housing 31 sealably divided by diaphragm 32 into a control chamber 33 and a flow chamber 34. Disposed within the flow chamber is an annular partition 35 forming a valving chamber 36 which may be closed off by the diaphragm 32. The control chamber and valving chamber of valve means 29 and the flow chamber of valve means 30 are connected to the outlet 28. The flow chamber of valve means 29 and the control chamber of valve means 30 are connected to the conduit 26. The valving chamber 36 of valve means 30 is in communication with the atmosphere and provides an unrestricted exhaust function. With this arrangement the operation of the pressure inverter is as follows. If the branch pressure is increasing the spool member 11 will move downwardly to close off valving chamber 25. At this point valve means 29 will be nearly at the closing point since the pressures above and below the diaphragm are equal. Hence a slight venting of air through venting means 27 will close valve means 29 and accordingly flow chamber 34 of valve means 29 will be exhausted so that valve means 29 remains closed. Simultaneously control chamber 33 of valve means 30 will be exhausted through venting means 27 so that valve means 30 will open and allow the output pressure to exhaust through valving chamber 36 of valve means 30. Hence the output pressure is decreasing while the branch line pressure is increasing until the forces on the spool member just balance and begin to allow communication between main pressure chamber 17 and valving chamber 25. If on the other hand the branch line pressure decreases, the spool member will move upwardly to open valving chamber 25 and allow main pressure to be transmitted to the flow chamber 34 of valve means 29 and the control chamber 33 of valve means 30. Accordingly valve means 29 will open and valve means 30 will close so that pressure is supplied to the output and simultaneously venting is prevented. Hence the output pressure is increasing as the branch line pressure is decreasing until again the spool member just opens valving chamber 25. This sequence of events is depicted in the table in FIG. 3 wherein A, B, and C designate the valves in the double-layered diaphragm module 10, valve means 29 and valve means 30 respectively. If the branch line pressure is constant, valves A, B, and C will generally be held closed although each will intermittently crack open to allow corrections in the output due to the slow venting of air through venting means 27. The relationship between the output pressure and the branch line pressure in the above described pressure inverter is illustrated by the graph in FIG. 2.

While the subject invention has been described within the context of a pneumatic control system, it is intended that the scope of the invention be limited only by the scope of the appended claims.

The embodiments of the invention in which an exclusive property or right is claimed are defined as 1. A fluid pressure inverter having a main pressure inlet, a branch pressure inlet, and a pressure output means, comprising:

first valve means comprising a housing, outlet means in the housing, pressure responsive means defining first, second, third and fourth chambers, the branch pressure inlet, the pressure output means, and the main pressure inlet communicating with the first, third, and fourth chambers respectively, the pressure responsive means arranged to open the outlet means in response to increasing pressure in the first or third chambers, and to close the outlet means in response to decreasing pressure in the first or third chambers, and venting means connected to the outlet means;

supply valve means connected to the pressure output and having an inlet connected to the outlet means of the first valve means upstream of the venting means, the supply valve means comprising means responsive to increasing pressure at its inlet for effecting communication between its inlet and the pressure output means and for preventing said communication in response to increasing pressure in the pressure output means; and, exhaust valve means connected to the supply valve means and to the pressure output means and comprising an outlet and the means responsive to increasing pressure in the pressure output means for effecting communication between the pressure output means the the exhaust valve means outlet, and for preventing said communication in response to increasing pressure at said supply valve means inlet.

2. A fluid pressure inverter according to claim 1 wherein the supply valve means and the exhaust valve means each comprises:

housing means;

diaphragm dividing the housing means into a control chamber and flow chamber; and, partition means disposed within said flow chamber and arranged to cooperate in a sealable relation with the diaphragm means to further define the valving chamber.

3. A fluid pressure inverter according to claim 2 wherein;

the control chamber and the valving chamber of the supply valve means are connected to the pressure output means; and, the flow chamber of the supply valve means is connected to the venting means.

4. A fluid pressure inverter according to claim 3 wherein;

the control chamber of the exhaust valve means is connected to the flow chamber of the supply valve means and to the venting means;

the flow chamber of the exhaust valve means is connected to the pressure output means; and, the valving chamber of the exhaust valve means is in communication with the atmosphere.

5. A fluid pressure inverter having a branch pressure inlet, a main pressure inlet, and a pressure outlet, comprising:

first valve means connected to the branch pressure inlet, the main pressure inlet, and the pressure outlet, the first valve means including a housing, a spool member disposed in the housing, a valving chamber connectable to the main pressure inlet and arranged to be closed off by the spool member, and pressure responsive means associated with the spool member responsive to the outlet pressure and the branch pressure to urge the spool member in a first direction to close off the main pressure inlet from the valving chamber and further responsive to the main pressure to urge the spool member in a second direction to connect the main pressure inlet to the valving chamber;

second valve means having an inlet connected to the valving chamber of the first valve means and an outlet connected to the pressure outlet of the fluid pressure inverter, the second valve means comprising means responsive to main pressure to transmit main pressure to the pressure outlet of the fluid pressure inverter when the main pressure exceeds the sum of the outlet and branch pressure;

third valve means having an inlet connected to the pressure outlet of the fluid pressure inverter and an outlet connected to atmosphere, the third valve means comprising means responsive to main pressure to transmit outlet pressure to the atmosphere when the sum of the outlet and branch pressures exceeds the main pressure; and, venting means connected to the valving chamber of the first valve means and the inlet of the second valve means.

6. A fluid pressure inverter according to claim 5 wherein the second and third valve means each comprises:

housing means;

diaphragm means dividing the housing means into a control chamber and a flow chamber; and, partition means disposed within the flow chamber and arranged to cooperate in a sealable relation with the diaphragm means to further define a valving chamber.

7. A fluid pressure inverter according to claim 6 wherein:

the control chamber of the second valve means is connected to the pressure outlet of the fluid pressure inverter;

the valving chamber of the second valve means is connected to the outlet of the second valve means; and the flow chamber of the second valve means is connected to the inlet of the second valve means.

8. A fluid pressure inverter according to claim 7 wherein:

the control chamber of the third valve means is connected to the inlet of the second valve means;

the flow chamber of the third valve means is connected to the inlet of the third valve means; and, the valving chamber of the third valve means is connected to the outlet of the third valve means.

* * * * *